Oct. 17, 1933.   J. CAESAR ET AL   1,931,141
ENDLESS CHAIN ELEVATOR AND CONVEYER
Filed Sept. 17, 1930   4 Sheets-Sheet 1

Inventors
John Caesar
Smith Eggleston
By Stryker & Stryker
Attorneys

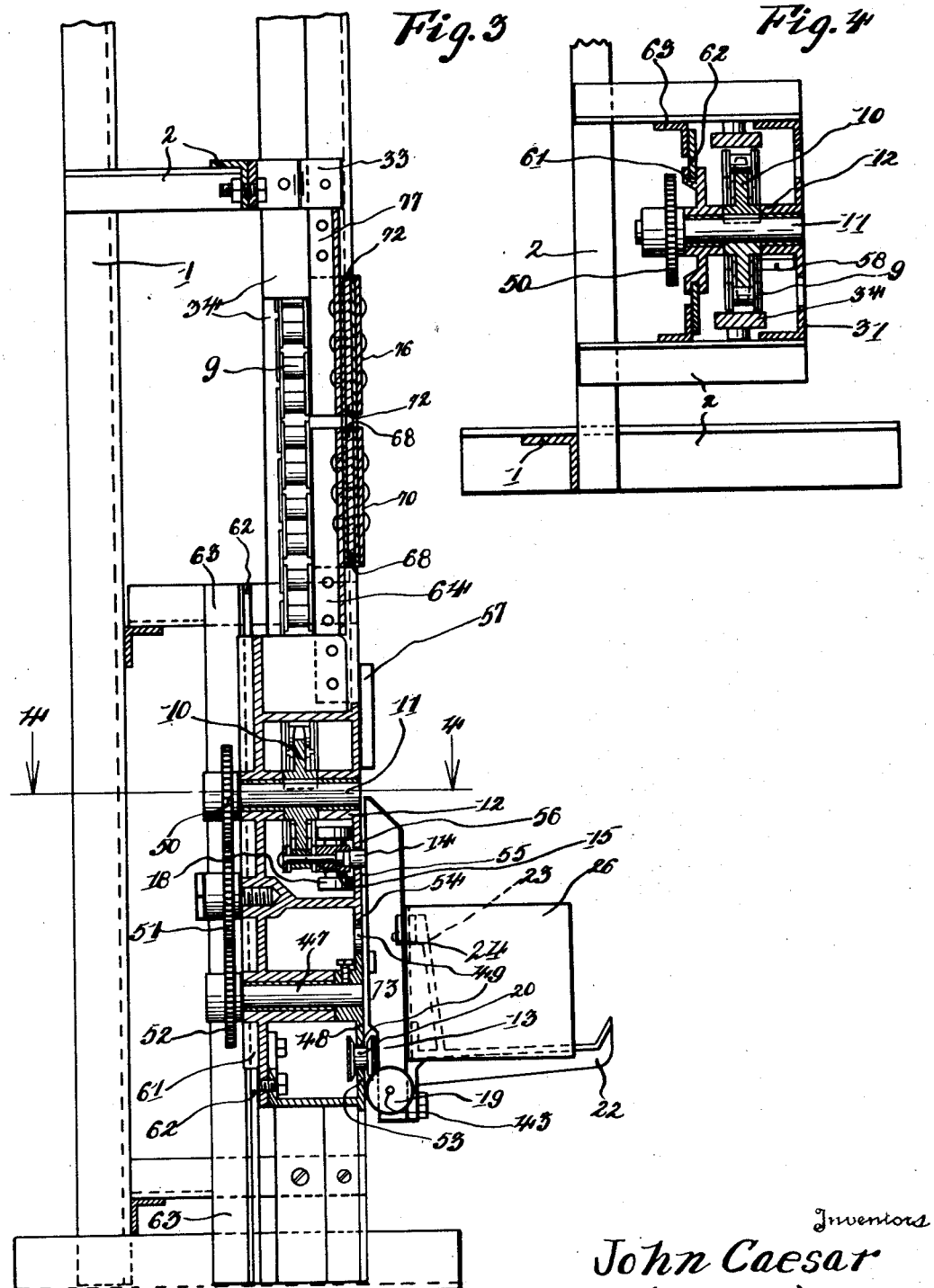

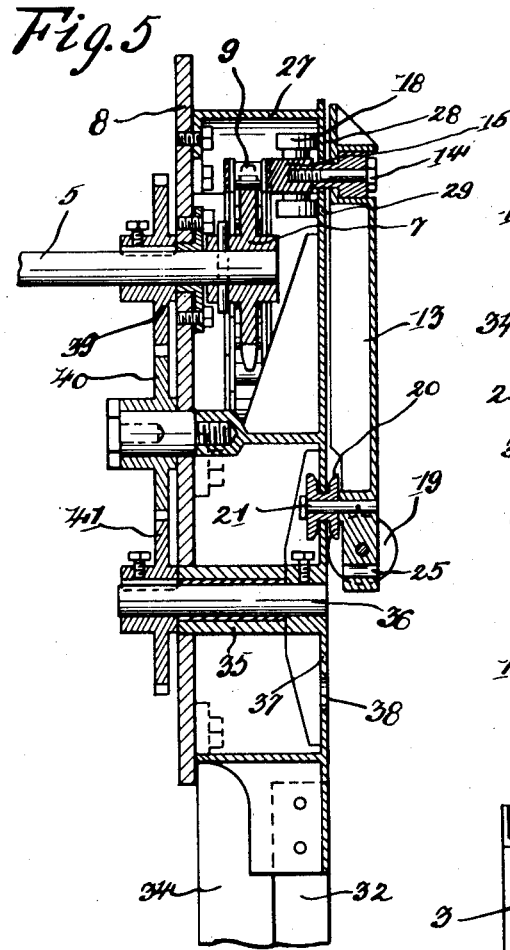

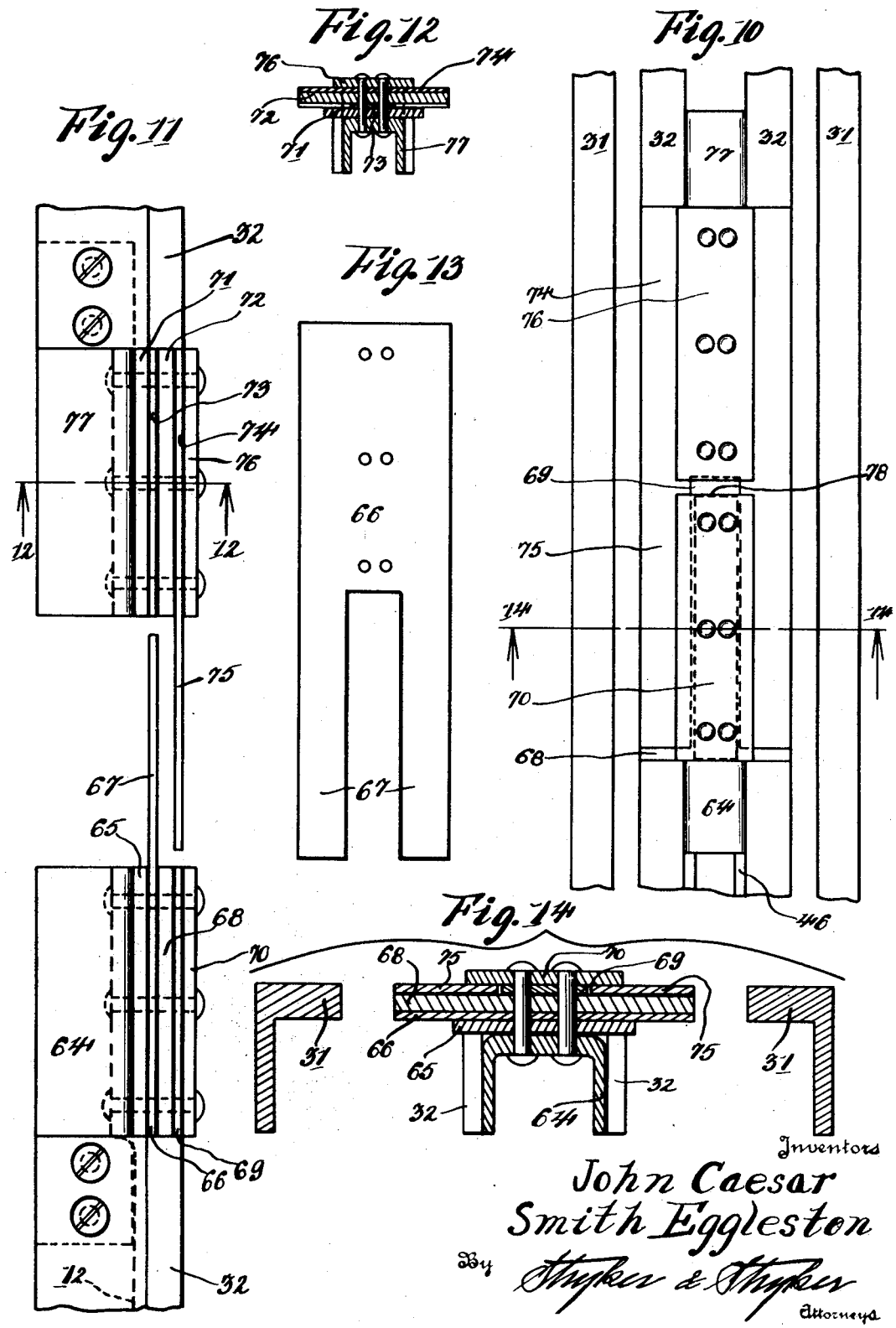

Patented Oct. 17, 1933

1,931,141

UNITED STATES PATENT OFFICE 1,931,141

ENDLESS CHAIN ELEVATOR AND CONVEYER

John Caesar and Smith Eggleston, St. Paul, Minn., assignors to Standard Conveyor Company, North St. Paul, Minn., a corporation of Minnesota Application September 17, 1930
Serial No. 482,484

14 Claims. (Cl. 198—138)

This invention relates to a conveyer of the endless chain type having carriers secured to the chain at intervals, and particularly, although not exclusively, adapted for use in a vertical plane as an elevator.

It is our object to provide a conveyer of this type adapted to be operated at an unusually high speed and having means for guiding the carriers adapted to insure smooth operation and maintenance of the carriers in proper predetermined positions at all times. Another object is to provide novel and efficient means for steadying the carriers as they pass from one longitudinal run of the chain to another. A further object is to provide a compact conveyer of this type in which the carriers are guided around unusually abrupt turns smoothly and with a minimum of friction. A still further object is to provide novel means for permitting compensation for wear in the chain of the conveyer and at the same time to afford continuous, smooth guides for the carriages. Other objects will appear and be more fully pointed out in the following specification and claims.

Figure 1:
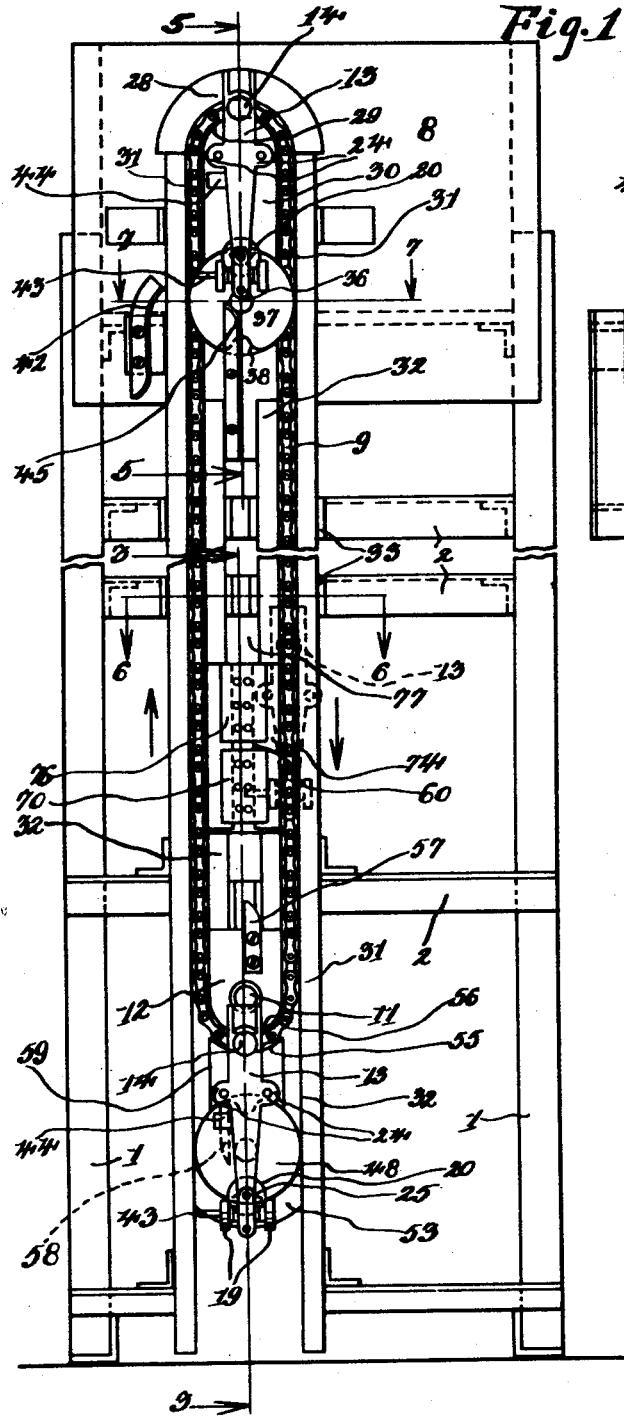
Figure 2:
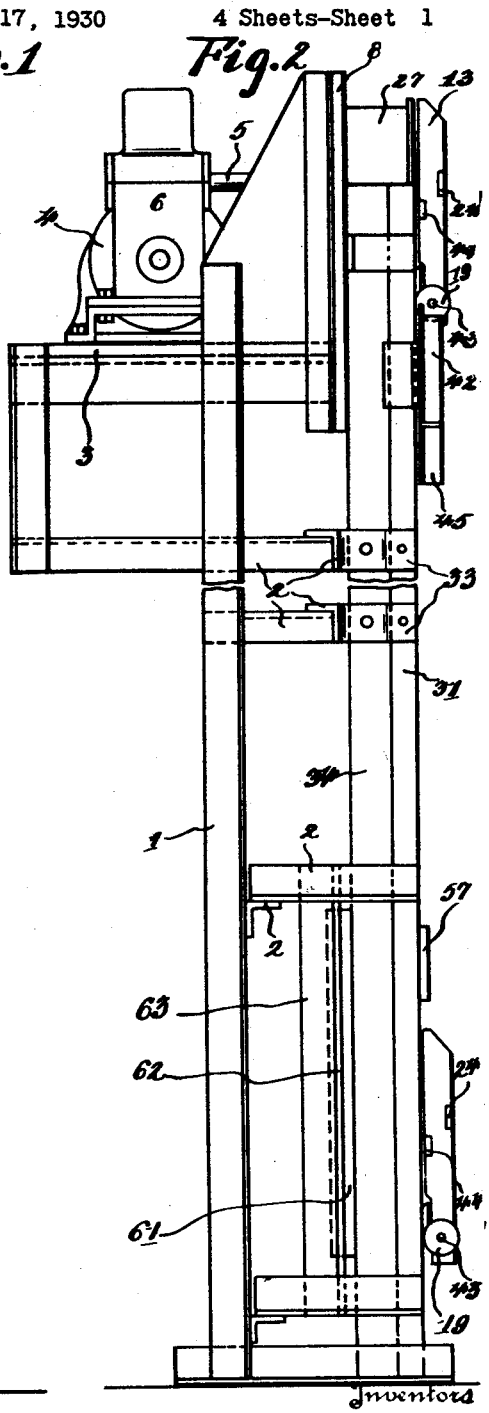

Referring to the accompanying drawings, which illustrate the best form of our invention at present known to us, Figure 1 is a front elevation of the conveyer with portions of the carriers removed for clearness; Fig. 2 is a side elevation of the same; Fig. 3 is an enlarged vertical section through the lower end of the conveyer taken on the line 3—3 of Fig. 1 and showing one of the carriers in side elevation; Fig. 4 is a fragmentary, horizontal section taken on the line 4—4 of Fig. 3; Fig. 5 is a fragmentary, vertical section through the upper portion of the conveyer taken on the line 5—5 of Fig. 1 and also showing one of the carriers in vertical section; Fig. 6 is a typical horizontal section taken on the line 6—6 of Fig. 1; Fig. 7 is a fragmentary, horizontal section taken on the line 7—7 of Fig. 1; Fig. 8 is a detail, vertical section taken on the line 8—8 of Fig. 6; Fig. 9 is a plan view of the elevator showing the power actuated drive therefor; Fig. 10 is an enlarged front view showing the automatic take-up section of the guides; Fig. 11 is a side view of said take-up section with the upper and lower portions thereof drawn apart and the thickness of the metal exaggerated for clearness; Fig. 12 is a horizontal section on a smaller scale taken on the line 12—12 of Fig. 11; Fig. 13 is a front view of one of the fork plates of the take-up and Fig. 14 is a horizontal section taken on the line 14—14 of Fig. 10 with the thickness of the metal exaggerated for clearness.

We provide a rigid frame consisting of a series of vertical angle bars 1 connected by transverse angle bars 2. Constructed near the upper end of the elevator is a platform 3 to support an electric drive motor 4. The motor drives a horizontal shaft 5 at a reduced speed, a suitable gear reduction being provided in a casing 6 also supported on the platform 3. Fixed on the front end of the drive shaft 5 is a sprocket wheel 7, said shaft being journaled in a suitable bearing supported on a standard 8. An endless chain 9 extends around the upper periphery of the sprocket wheel 7 and is suspended therefrom. A second sprocket wheel 10 (Fig. 3) guides the chain 9 near the lower end of the elevator and this sprocket wheel 10 is fixed on a shaft 11 journaled in a casting 12.

Secured to the chain 9 at suitable intervals is a series of carriers 13. These carriers are swiveled on pins 14 which, as best shown in Fig. 8, project from blocks 15. Each block 15 is connected to the chain 9 by a pair of pins 16 so that the block is inverted as it passes around the sprocket wheels. The heads of the pins 16 are counter-sunk in the block 15 and a small shaft 17 extends transversely through said block to support a pair of rollers 18, one on each side of said block. These rollers 18 are adapted to run on the back surfaces of the guides hereinafter described and prevent distortion of the chain under the weight of the carriers and goods carried thereby. The carriers 13 are thus suspended from the chain and their lower ends are provided with a second pair of rollers 19 to run on the front surfaces of the guides. A flanged guide wheel 20 projects into the plane of the guides to engage their edges, said wheel being freely journaled on a pin 21. It will be noted that the wheel 20 is located beneath the point of suspension of the carrier but above the antifriction rollers 19. To support the goods to be carried on the carriers 13, an arm 22 (Figs. 3 and 6) is secured thereto, said arm having a hanger portion 23 which is bolted to ears 24 on the carrier and also to the lower portion of the carrier having perforations 25 to receive the attaching bolts or rivets. Upwardly projecting side members 26 are provided on the carriers to confine the package, box or other object to be carried. It will be understood that the form and arrangement of the supports for the objects to be carried may be varied at will to meet the requirements of the type of goods to be carried.

Only the main portions of the carriers are shown in Figs. 1, 2 and 5. The carriers are designed to be automatically loaded and unloaded by suitable mechanism adapted to project between the side members 26 and arm 22.

The guides for the upper portion of the elevator are integral with or secured to a large casting 27 secured to the standard 8. Integral with the casting 27 is an arcuate outer guide 28 and an arcuate inner guide 29 having their adjacent edges spaced apart to freely receive the pin 14 between them. These guides 28 and 29 extend in an arc which is concentric with the sprocket wheel 7. In continuation of the arcuate guide 29 is a pair of straight, inner guide flanges 30 formed on the casting 27 to extend downward in parallel relation with a pair of straight outer guides 31. As best shown in Figs. 1 and 6, the outer guides 31 are formed from straight angle bars which extend continuously from the bottom of the elevator to the arcuate guide 28.

In continuation of the guide flanges 30, inner guides 32 extend downward in parallel spaced relation to the guides 31. As shown in Fig. 6, the guides 31 and 32 are secured to supporting yokes 33 which project from the transverse frame members 2 of the elevator and are secured to said frame members. The longitudinal runs of the chain 9 pass in parallel relation to the guides 31 and 32 and are embraced by the yokes 33. Suitable lining strips 34 of wood extend longitudinally of the chain to guide it and prevent contact with the metal guides and supports therefor.

The casting 27 at the upper end of the elevator is formed with a bearing 35 for a shaft 36 carrying a rotary guide disk 37. This disk extends in the plane of the stationary guides 31 and 32 and has openings 38 in its periphery to receive the pins 14 and flanged wheels 20 on the carriers 9. The disk is driven in timed relation to the sprocket wheel 7 by a series of spur gears 39, 40 and 41, the gear 39 being fixed on the shaft 5 and the gear 41 being fixed on the shaft 36. The gear 40 is an idler to transmit rotary movement, in the proper direction, to the gear 41. To insure movement of the flanged wheel 20 on a carriage into an opening 38 in the disk 37, we provide a short guide 42 fixed on an upper frame member to engage a projecting pin 43 on the carriage. This pin 43 extends in continuation of the axial pin for the roller 19 on each carriage. Projecting adjacent to the front of the disc 37 is a short guide 45 adapted to be engaged by an end of the pin 43 to direct the wheel 20 between the straight guides 31 and 32 at the moment when said wheel is free to pass downward from the disc 37.

Near the lower end of the elevator the large casting 12 is provided to support the several bearings and moving parts and the guides, with the exception of the outer, straight guides 31. This casting 12 has, in addition to the journal bearing for the shaft 11, another bearing for a shaft 47 carrying a guide disk 48 like the disk 37. In the periphery of the disk 48 openings 49 are provided to receive flanged wheels 20 on the carriers. The shaft 47 is adapted to be driven to rotate the disk in timed relation to the sprocket wheel 10, by a series of spur gears 50, 51 and 52. The gear 51 is an idler which is journaled on a pin threaded in the casting 12 and meshes with the gears 50 and 52.

The casting 12 is formed with an outer arcuate guide 53 to support the rollers 19 and guide the wheel 20 at the lower periphery of the disk 48. Above this disk an arcuate guide flange 54 is formed and adjacent to the sprocket wheel 10 outer and inner guide flanges 55 and 56 are provided to receive the pins 14 between them and to guide the rollers 18. To prevent the flanged wheel 20 on a carriage from passing between the guide flanges 55 and 56, a short stationary guide 57 is fixed on the front of the casting 12 at a suitable point to engage a lug 44 on the carriage at the proper point in the path of travel of said carriage. Upon the back surface of the disk 48 another short guide 58 (Fig. 1) projects from the casting 12 to engage the inner flange on the wheel 20 and prevent said wheel from continuing around the disk where it meets the outer guide 31 and a straight inner guide flange 59 formed in the casting 12. The flange 59 extends in spaced, parallel relation to the outer guide 31 at each side so that guide slots are formed in continuation of the openings between the inner guides 32 and outer guides 31 for the wheels 20.

We provide means for automatically maintaining the chain 9 under tension and for compensating for wear and expansion and contraction of the metal chain. To this end the weight of the casting 12 is suspended on the chain 9 and a telescoping or take-up section 60 is interposed between the upper and lower portions of the inner guides 32. As best shown in Fig. 4, the casting 12 is formed with flanges 61 to slidably engage guide plates 62 secured to angular frame members 63. Thus the lower casting 12 and associated mechanism is slidable vertically between the guide plates 62. Bolted to the upper end of the casting 12 is a vertical channel member 64 (Figs. 10, 11 and 14). Upon the front face of the channel member 64 is a rigid rectangular plate 65 which, in turn, has fixed on its front face a thin metal fork member 66 having a pair of fingers 67 projecting upward beyond the upper end of the channel member 64 and plate 65. The lower portion of the fork member 66 is covered by a relatively thick plate 68 equal in width to said fork member. Extending centrally along the plate 68 is a spacing plate 69 covered by a stiffening plate 70. The spacing plate 69, fork member 66 and plates 65, 68 and 70 are rigidly secured in overlapping relation to each other by rivets, as clearly shown in Fig. 14.

The fingers 67 are slidably held between a plate 71 (Figs. 11 and 12) and a wider plate 72 which are spaced apart by a narrow spacing plate 73. Upon the outer face of the plate 72 is a fork member 74 having downwardly projecting fingers 75, like the fingers 67, to slidably pass between the plates 68 and 70, as shown in Fig. 14. A stiffening plate 76 is placed on the outer surface of the upper portion of the fork member 74 and the several plates 71, 72, 73 and 76 and the fork member 74 are rigidly secured to the lower portion of a channel member 77, as shown in Fig. 12. The sum of the thicknesses of the fork members 67 and 75 and the plate 68 is approximately equal to the thickness of the several guides, such as the outer guides 31 and inner guides 32, so that the telescoping or sliding portions of the take-up section form a continuation of the inner guides 32. At their lower ends these guides 32 are rigidly secured to the upper ends of the channel members 77, as shown in Figs. 10 and 11.

When the elevator is assembled the lower end of the channel member 77 and plates 71, 72, 75 and 76 are spaced from the upper ends of the channel 64 and plates 65, 68, 69 and 70 so that a gap or space 78 is allowed between these members. However, this gap is spanned by the pairs of fingers 67 and 75 which form continuations of the inner guides 32 equal in width and thickness to the other stationary guides so that the rollers 18, 19 and wheel 20 on the carriers pass along the take-up section over an unbroken smooth guide.

Where the plate 68 is exposed at the lower end of the fingers 75 there is a slight depression over which the rollers 19 pass readily and a similar depression is located at the upper ends of the fork members 67 over which the rollers 18 pass. However, these depressions are so slight, being only equal in depth to the thickness of the thin plates 66 and 74, that they do not interfere with the smooth operation of the elevator. The plates 66 and 74 are preferably constructed from sheet steel of about 20-gauge thickness, while sheet steel of the same thickness is employed for the spacers 69 and 73. The plates 68 and 72 are preferably of 12-gauge and the plates 76, 70, 65 and 71 of 16-gauge steel. It will be evident that no extensible section is necessary in the outer guides 31 which extend continuously in spaced relation to the inner guides.

Operation

In operation the chain 9 may be continuously driven, in the direction indicated by arrows in Fig. 1, by the motor 4 through its connection with the upper sprocket wheel 7. The several carriers 13, secured at regular spaced intervals to the chain, are always maintained in proper upright or predetermined position by the guides. The weight of the load is transmitted to the front surfaces of the guides by the rollers 19 near the lower end of each carriage while the outward pull at the upper end of each carrier is transmitted to the inner surfaces of the guides by the rollers 18.

Assuming that a carrier is passing up the left run of the chain, as seen in Fig. 1, the wheel 20 projects into the plane of the guides and, by engagement with the edges of the guides, prevents any swinging or pivoting about the axis of the pin 14. As the pin 14 reaches the disk 37 one of the openings 38 in said disk is presented to the pin and allows it to pass upward in said opening. When the wheel 20 on the carriage reaches the disk 37 the other opening 38 in said disk has moved to such position as to receive and guide said wheel while the pin 14 starts between the curved guides 28 and 29. The projecting pin 43 on the carriage now engages the guide 42 and prevents the passage of the wheel 20 upward past the disk. In other words, the guide 42 causes the wheel 20 to remain in the opening 38 so that the lower end of the carrier is moved by the disk in an arc having a radius equal to the radius of movement of the pin 14 by the sprocket wheel. It will be understood that the rate of turning of the disk 37 is equal to that of the sprocket wheel so that the carriage is at all times maintained in upright position and is steadied as it passes from one run of the chain to the other.

As the wheel 20 is carried by the disk 37 to a position where said wheel is free to pass downward between the straight guides 31 and 32, the pin 43 on the carriage strikes the guide 45 and forces the wheel 20 to enter the space between straight guides. It will be noted that the block 15 connecting the carrier to the chain turns about the axis of the pin 14 as the chain passes around the sprocket wheels so that the wheels 18 mounted on said block follow the curved guides 28 and 29 and continuously engage the back surface thereof with smooth rolling engagement. This rolling contact continues as the carrier moves down along the guides 31 and 32 and the back, front and edge surfaces of the longitudinal guides continue, unbroken, past the take-up section 60. When the carrier approaches the lower end of the downward run the stationary guide 57 strikes the lug 44 on the carrier and prevents the wheel 20 from passing between the curved guide flanges 55 and 56. Thus the wheel 20 is caused to pass between a guide flange 59 and outer guide 32, downward to the disk 48. Rotation of this disk is so timed that one of the openings 49 receives the wheel 20 upon its arrival at the periphery of the disk. Thereafter the disk 48 moves the lower end of the carriage in an arc having a radius corresponding to that taken by the pin 14 in passing around the sprocket wheel 10. During this part of the cycle, the wheels 19 are supported on the arcuate guide 53 which has front and back surfaces flush with the corresponding surfaces of the guides 31 and 32 and disc 48. Now, as the upward movement starts, the wheel 20 strikes the guide finger 58 and is forced to pass between the guide flange 59 and outer guide 31.

It will thus be evident that the disks 37 and 48 fill in the gaps which are necessary in the stationary guides and these disks and the adjacent stationary guides form a continuous support for the rollers 18 and 19 and wheel 20. They also positively retain the carriers in upright position irrespective of the speed of the conveyer and small radius of the sprocket wheels so that the direction of movement of the carriers may be quickly reversed without danger of jamming the carrier or spilling the load. Our arrangement of anti-friction rollers and wheels on the carriers is adapted to insure smooth operation and to properly distribute the load on the guides.

Having described our invention, what we claim as new and desire to protect by Letters Patent is:

1. An elevator having in combination sprocket wheels, an endless chain operable upon said wheels in a vertical plane, a stationary guide having a plane, smooth guide face in parallel relation to said chain, a movable guide having a plane, smooth face extending in continuation of said stationary guide face and in a common plane therewith to permit the passage of a roller smoothly from one to the other of said faces, a carrier suspended from said chain for movement along said guides, a projection on said carrier, means on said movable guide for engaging said projection to retain said carrier in upright position, means for actuating said movable guide in timed relation to said chain and anti-friction rollers arranged to support said carrier continuously during its passage along said stationary and movable guides by engagement with the said faces of said guides.

2. In an elevator, the combination with sprocket wheels and an endless chain operable upon said wheels in a vertical plane, of a stationary guide having front and back surfaces extending in parallel relation to said chain and having arcuate portions adjacent to said wheels arranged substantially concentrically therewith, a carrier suspended from said chain adjacent to the front surface of said guide, a roller near the upper end of the carrier engaging the back surface of said guide, a second roller near the lower end of said carrier engaging the front surface of said guide, a projection on the carrier extending in the plane of said guide, guide members forming a groove between them adapted to confine said projection and extending beyond said sprocket wheel, a rotary guide mounted near one of said sprocket wheels and having a rigid, integral part projecting into said groove and movable therein to engage said projection for maintaining the carrier in upright position and means for actuating said movable guide in timed relation to said sprocket wheel.

3. An elevator having in combination sprocket wheels, an endless chain operable upon said wheels in a vertical plane, a stationary guide having a plane, smooth back face in parallel relation to said chain and arcuate portions concentric with said wheels, a rotary guide having a plane, smooth back face extending in continuation of said stationary guide face and in a common plane therewith to permit the passage of a roller smoothly from one to the other of said faces, a carrier suspended from said chain for movement along said guides, a projection on said carrier beneath the point of suspension thereof, means on said rotary guide for engaging said projection to retain said carrier in upright position, means for turning said rotary guide in timed relation to said chain and rollers mounted on said carrier to support the same continuously during its passage along said stationary and rotary guides by engagement with said faces of said guides.

4. In a conveyer of the class described, an endless chain, sprocket wheels over which said chain passes, a supporting member for a carrier rigidly secured to said chain to turn therewith, a longitudinal member of a carrier pivotally secured to said supporting member, a pair of rollers mounted on opposite sides of said supporting member to turn therewith relative to said longitudinal member, guides having front and back surfaces extending in parallel relation to said chain, said rollers being adapted to run upon the back surfaces of said guides, an anti-friction wheel revolubly mounted on said longitudinal member and having an axis of rotation extending perpendicular to the axis of said rollers, said last mentioned wheel extending between said guides, a second pair of rollers on the longitudinal member to engage the front surfaces of said guides and movable means for engaging said anti-friction wheel to steady said carrier member in passing from one run of said chain to the other.

5. In a conveyer of the class described, an endless chain operable in a vertical plane, sprocket wheels over which said chain passes, a supporting member for a carrier rigidly secured to said chain to turn therewith, a longitudinal member of a carrier pivotally suspended from said supporting member, anti-friction rollers mounted on opposite sides of said supporting member to turn therewith relative to said longitudinal member, spaced guides extending in parallel relation to said chain and having front and back surfaces for engagement with rollers, said guides having arcuate portions concentric with one of said sprocket wheels said first mentioned rollers being adapted to run upon the back surfaces of said guides to maintain rolling contact with said arcuate portions, an anti-friction wheel revolubly mounted on said longitudinal member beneath said supporting member and having an axis of rotation extending perpendicular to the axis of said rollers, said last mentioned wheel being adapted to extend between said guides, another roller mounted on said longitudinal member to run on the front of said guides and means for engaging said anti-friction wheel to maintain said carrier member in upright position in passing from one run of said chain to the other.

6. In a conveyer, an endless chain, sprocket wheels over which said chain passes, a carrier secured to said chain, inner and outer guides for said carrier extending in a common plane parallel to said chain and spaced apart to receive a carrier member between them, said outer guides being unbroken from end to end of the conveyer and said inner guides being formed with stationary and movable sections, telescoping members of said stationary and movable sections forming continuous, smooth surfaces for engagement with carrier members and anti-friction carrier members movable in continuous contact with said guides from one of said sections to the other.

7. In a conveyer, an endless chain, sprocket wheels over which said chain passes, a carrier secured to said chain, inner and outer guides for said carrier extending parallel to said chain and spaced apart to receive a carrier member between them, said inner guides being formed with stationary and movable sections and one of said sprocket wheels being movable with said movable section to tighten the chain, overlapping members of said stationary and movable sections forming continuous, smooth surfaces for engagement with carrier members and anti-friction wheels arranged on said carrier to support the same on said guides and to roll smoothly from one of said sections to the other.

8. In an elevator, an endless chain, sprocket wheels over which said chain passes, inner and outer guides extending parallel to said chain and spaced apart to receive carrier members between them, said guides having front, back and edge surfaces for engagement with carrier members, said outer guides being unbroken from end to end of the conveyer and said inner guides being formed with stationary and movable sections and one of said sprocket wheels being movable with said movable section to tighten the chain, telescoping members of said stationary and movable sections forming continuous, smooth surfaces for engagement with carrier members, a carrier secured to said chain and anti-friction members on said carrier engaging the front, rear and edge surfaces of said inner and outer guides and movable smoothly in contact with said sections from one to the other of said telescoping members.

9. In an elevator having a carrier to be guided, a longitudinally extensible guide for said carrier having members of said guide to be connected together, end to end, and means for connecting said members together comprising, a thin plate projecting from one of said guide members, a second thin plate connected to the other guide member in spaced, parallel relation to said first mentioned plate and means for slidably aligning said plates on the ends of said guide members.

10. In an elevator having a carrier to be guided, a longitudinally extensible guide having front, back and edge guiding surfaces for said carrier, members of said guide to be connected together, end to end, and means for connecting said members together comprising, a thin plate projecting from one of said guide members and having front and edge guide surfaces for the carriers, a second thin plate connected to the other guide member in spaced, parallel relation to said first mentioned plate, said second plate having back and edge surfaces for guiding the carrier and slidable means for aligning said plates on the ends of said guide members.

11. In an elevator having a carrier to be guided, a longitudinally extensible guide for said carrier, members of said guide to be connected together, end to end, and means for connecting said members together comprising, a thin plate projecting from one of said guide members, a second thin plate connected to the other guide member in spaced, parallel relation to said first mentioned plate, a spacer plate fixed on one of said members between said thin plate and overlapping, relatively thick plates on the ends of said guide members for stiffening said thin plates.

12. In an elevator, the combination with sprocket wheels and an endless chain operable upon said wheels in a vertical plane, of a stationary guide having front and back surfaces for engagement with carrier members, a carrier suspended from said chain adjacent to the front surface of said guide, a roller near the upper end of the carrier engaging the back surface of said guide, a second roller near the lower end of said carrier engaging the front surface of said guide, a wheel on the carrier having an axis of rotation perpendicular to the axes of said rollers and means to engage said last mentioned wheel for maintaining the carrier in upright position comprising a rotary disk having front and back faces disposed in continuation respectively of the front and back surfaces of said stationary guide to form continuations thereof permitting the smooth passage of said rollers to and from said faces and the periphery of said disk being formed with a notch to engage said wheel and means for rotating said disk in timed relation to said chain.

13. In an elevator, the combination with sprocket wheels and an endless chain operable upon said wheels, of a stationary guide having front, back and edge surfaces for engagement with carrier members, a carrier suspended from said chain adjacent to the front surface of said guide, a roller near the upper end of the carrier engaging the back surface of said guide, a second roller near the lower end of said carrier engaging the front surface of said guide, a wheel on the carrier to engage said edge surface of said guide, and means for maintaining the carrier in upright position during its movement from one run to the other of said chain comprising a rotary disk having front and back faces disposed in continuation respectively of the front and back surfaces of said stationary guide to form continuations thereof permitting the smooth passage of said rollers to and from said faces and the periphery of said disk being formed with a notch to engage said wheel and means for rotating said disk in timed relation to said chain.

14. In a conveyer of the class described, an endless chain, sprocket wheels over which said chain passes, a supporting member for a carrier rigidly secured to said chain to turn therewith, a carrier having a longitudinal member pivotally secured to said supporting member, anti-friction rollers mounted on opposite sides of said supporting member to turn therewith relative to said longitudinal member, spaced guides having front and back surfaces extending in parallel relation to said chain, said rollers being adapted to run upon the back surfaces of said guides, a second pair of anti-friction rollers on said longitudinal member engaging the front surfaces of said guides, an anti-friction wheel on the carrier having its axis of rotation extending perpendicular to the axis of said rollers and means for engaging said anti-friction wheel to steady said carrier in passing from one run of said chain to the other.

JOHN CAESAR.
SMITH EGGLESTON.